United States Patent Office 3,067,183
Patented Dec. 4, 1962

3,067,183
POLYMERIZATION OF OLEFINS WITH A CATALYST SLURRY PREACTIVATED WITH ETHYLENE
Hugh J. Hagemeyer, Jr., and Marvin B. Edwards, Longview, Tex., assignors to Eastman Kodak Company, Rochester, N.Y., a corporation of New Jersey
No Drawing. Filed Oct. 15, 1956, Ser. No. 615,775
7 Claims. (Cl. 260—88.2)

This invention relates to the polymerization of monoethylenically unsaturated polymerizable material in liquid medium by means of an ionic catalyst mixture and is particularly concerned with the polymerization of α-monoolefins in an inert organic liquid vehicle using an ionic catalyst mixture including an organometallic component and a transition metal compound wherein the catalyst mixture has been preactivated to a much more highly active state than is ordiarily the case.

For many years, ethylene was polymerized to solid polymer by use of very high pressures of the order of 500 atmospheres using peroxy catalysts, and it was not possible to polymerize many of the high olefins to solid polymer at all.

More recently, it has been found that the monoethylenically unsaturated polymerizable monomers can be polymerized in liquid medium to solid polymers using what are known as ionic catalysts wherein an organometallic component is employed in conjunction with a transition metal compound to give catalyst mixtures which are effective at relatively low temperatures and pressures. These so-called ionic catalyst mixtures have become well known in the art, and a large number of such mixtures are disclosed in such references as U.S. 2,721,189, Belgium 534,792, Belgium 533,362, and similar patents, as well as a number of literature references such as Chimica Industria 38 (2), 124–127 (February 1956). Other ionic catalysts are disclosed in Australian patent application 9651 as well as the copending application of Shearer and Coover Serial No. 549,840, filed November 29, 1955.

In general, the ionic catalysts which are used are those wherein an alkali metal alkyl or an aluminum, zinc or manganesium alkyl or alkyl halide or an aluminum hydride is employed as a catalyst in admixture with a transition metal compound, i.e. a halide, alkoxide or similar compound titanium, zirconium, or similar transition metal compound. In general, the ionic catalysts with which this invention is concerned are the catalyst mixtures composed of a transition metal compound wherein the metal is from the fourth to the sixth subgroup of the periodic table and a metal, alloy, metal hydride or organometallic compound from the first to the third groups of the periodic table. The transition metal compounds which are preferably employed are the titanium halides or alkoxides, and the other component is desirably an aluminum trialkyl, alkali aluminum tetraalkyl, aluminum alkyl halide, alkali metal aluminum alky haide, alkali metal aluminum hydride, aluminum alkyl hydride, zinc dialkyl, magnesium dialkyl, or alkali metal alkyl. All of these and similar catalyst mixtures are included within the term "ionic catalyst mixture" as used hereinafter. These catalyst mixtures are distinguished from the metal oxides in being ionic in nature and are distinguished from the well known peroxides used in high pressure polymerization in containing at least two metal components.

The ionic catalyst mixtures can be used for polymerizing a large variety of monoethylenically unsaturated polymerizable materials including such materials as styrene, vinyl chloride, vinylidene chloride, and the like and are particularly useful in the polymerization of straight or branched chain aliphatic α-monoolefins containing 2–10 carbon atoms, either singly or in admixture, to give solid high molecular weight polymers. The polymerization employing such catalyst mixtures can be carried out at temperatures ranging from below room temperature as for example temperatures of 0° C. or lower to temperatures of the order of 150° C. or higher. The catalysts are also effective at pressures from atmospheric pressure to very high pressures of the order of 20,000 p.s.i. or higher, although only slightly superatmospheric pressures are usually required and hence pressures from atmospheric pressure to about 1000 p.s.i. are ordinarily employed.

One disadvantage of the ionic catalyst mixtures has been that it was necessary to employ relatively high concentrations of the catalyst mixture in order to achieve rapid polymerization and good yields of polymeric product. The nature of the catalyst mixtures, and particularly the presence of the metallic ions, made it necessary to remove the catalyst from the final polymer, and it is therefore desirable that the amount of catalyst employed be minimized wherever possible. In addition, the use of high concentrations of catalyst offers an economic drawback since the catalyst components are ordinarily relatively expensive, and it is consequently of particular advantage to be able to provide a means for activating the catalyst mixture whereby the amount employed can be reduced.

It is accordingly an object of this invention to provide a means for facilitating the polymerization of monoethylenically unsaturated polymerizable material in liquid medium by means of ionic catalyst mixtures by providing a method of enhancing the activity of the catalyst mixture prior to its use in the polymerization system.

Another object of the invention is to provide an ionic catalyst mixture including an organometallic component and a transition metal compound in a form of greatly increased activity whereby the concentration of catalyst which is necessary for use of the catalyst mixture in commercial manufacture of solid polymer is greatly reduced with a consequent economic advantage both in the amount of catalyst which must be used and in the problem of clean up to the polymeric product.

Another object of the invention is to provide a two-stage process wherein the catalyst mixture is activated in the first stage and the polymerization carried out in a second stage employing the preactivated catalyst.

Other objects will be apparent from the description and claims which follow.

These and other objects are attained by means of this invention as described in detail hereinafter with particular reference to certain preferred embodiments thereof. We have found that in the polymerization of monoethylenically unsaturated polymerizable material in an inert organic liquid vehicle by means of an ionic catalyst mixture, the polymerization can be greatly improved by first enhancing the activity of the catalyst mixture prior to bringing together the catalyst mixture, polymerizable material, and inert organic liquid vehicle, by reacting from 1 to 5 parts by weight of ethylene per part of the catalyst mixture with a slurry in an inert organic liquid vehicle of 1–10% by weight of the ionic catalyst mixture based on the weight of the vehicle in the slurry. When an ionic catalyst slurry is pre-reacted with 1–5 parts by weight of ethylene per part of catalyst in a slurry containing 1–10% of the ionic catalyst mixture based on the weight of the vehicle in the slurry, a highly active catalytic slurry is obtained which can be used at extremely low catalyst concentrations and which readily initiates the polymerization of monoethylenically unsaturated polymerizable material. Heretofore, catalyst concentrations of greater than 0.5% and often as high as 1% were necessary when using ionic catalyst mixtures in order to initiate the polymerization. When employing catalyst concentrations in this range, the reaction mixture, if polymer is formed, becomes too thick for efficient stirring or cooling long before all of the effective catalyst is used up or destroyed. This, of course, is wasteful of expensive catalytic components and also results in polymer containing an unduly high concentration of the catalyst components which must be removed from the final polymer.

In contrast to this, it has now been found that when ethylene is pre-reacted with the very highly concentrated catalyst slurry using only 1-5 parts by weight of ethylene per part of catalyst and preferably 2-3 parts of ethylene per part of catalyst, a catalytic slurry is obtained which can then be used in greatly diluted form for polymerizing the desired polymerizable monomers. The preactivated catalytic slurries offer a number of significant advantages to the polymerization art. Heretofore the ionic catalyst mixtures suffered a loss in activity upon storage, and hence it was necessary to prepare the catalyst mixture immediately prior to its use in the polymerization system. This is a serious disadvantage in commercial operations wherein it is highly desirable to have a stable catalyst mixture which can be prepared and stored until required for use. Furthermore, many of the ionic catalyst mixtures deposit a heavy, rapid settling precipitate which makes accurate metering of the catalyst mixture difficult. By prereacting the ionic catalyst mixture with 1-5 times its weight of ethylene in a slurry containing 1-10% of the catalyst mixture in an inert organic liquid vehicle, a highly stable catalytic slurry is obtained which can be stored for prolonged periods without loss in activity, and the highly active slurry can be accurately metered from storage tanks into the polymerization system as required.

Another advantage of the catalytic slurries embodying this invention is the very high yield of polymer which is obtained per unit weight of catalyst. The amount of residual catalyst left in the crude polymer is thus greatly decreased, and the polymer is easier to clean up. Furthermore, process costs are reduced both by the lowered catalyst consumption and the simplified polymer work up procedures required.

Another advantage of the highly active catalytic slurries of this invention is that vinyl monomers which are slow or difficult to polymerize by ionic catalyst mixtures, are readily polymerized by the highly active catalytic slurries of this invention. For example, vinyl chloride is difficult to polymerize with most of the catalysts composed of a compound of a transition metal from the fourth to the sixth sub-groups of the periodic table in combination with a metal, alloy, metal hydride or organometallic compound from the first to the third groups of the periodic table. By means of this invention, however, vinyl chloride is rapidly polymerized to give an excellent polymeric product. Similarly, propylene usually gives oily or gummy polymers with many of the ionic catalyst mixtures. In contrast to this, the catalytic slurries of the present invention give high yields of solid, highly crystalline polypropylene. In like manner, the higher α-monoolefins such as butene-1, pentene-1, 3-methylbutene-1, 4-methylpentene-1, 4-methylhexene-1, 5-methylhexene-1, 4,4-dimethylpentene-1, and similar higher olefins are readily polymerized either singly or in admixture by means of the highly effective catalytic slurries embodying the present invention. The process of this invention is thus applicable for polymerizing any of the monoethylenically unsaturated polymerizable materials, either singly or in admixture, and is particularly applicable to the polymerization of one or more of the straight or branched chain α-monoolefins of 2-10 carbon atoms. Particularly good results are achieved in the polymerization of ethylene, propylene, or mixtures of ethylene and propylene in any concentration.

The invention is concerned with activating any of the well known ionic catalyst mixtures and is not concerned with providing new ionic catalyst components. Since the ionic catalyst mixtures are well known in the art as indicated hereinabove, the invention will not be limited by enumerating specific ionic catalyst mixtures but is intended to apply to any of the ionic catalyst mixtures which include a compound of a transition metal from the fourth to the sixth sub-group of the periodic table and a metal, alloy, metal hydride or organometallic compound from the first to the third groups of the periodic table. Thus, as indicated, the transition metal compound can be any compound of titanium, zirconium, vanadium, or chromium, or similar transition metal. Similarly, the organometallic component is desirably an alkyl derivative of an alkali metal, aluminum, zinc or magnesium, including the alkyl halides of such metals. Furthermore, the metals themselves can be used in some cases or a metal hydride as is well known in the art. The proportions of the components in the ionic catalyst mixture can be varied rather widely, although molar ratios of from 4:1 to 1:4 are preferably employed for best results. The ionic catalyst mixture is reacted with 1-5 times its weight of ethylene and preferably 2-3 times its weight of ethylene in the activation stage, and the resulting activated slurry can be used in any desired concentration for the polymerization proper, although it is usually employed in a concentration of below 0.5% and often as low as 0.01% by weight based on the weight of vehicle employed in the polymerization.

The liquid vehicle employed in the catalyst slurry as well as in the polymerization itself can be any of the well known inert organic liquids containing no combined oxygen and free of water, alcohol, ether or similar oxygen-containing compounds. Thus, the vehicle can be any of the well known liquid alkanes, such as propane, hexane, heptane, or the like, or it can be an aromatic compound such as benzene, toluene, xylene or the like, or a chlorinated compound such as chlorobenzene, chlorotoluene, trichloroethane, or similar inert liquid. Other materials which are suitably employed as vehicle include the gasoline fractions of appropriate boiling range, tetralin, decalin, naphthalenes, kerosene, Stoddard solvent, and similar well known inert solvents free of combined oxygen. The preactivation as well as the polymerization can be carried out under a variety of temperature and pressure conditions with good results. Thus, the preactivation wherein the ethylene is reacted with the slurry of ionic catalyst can be effected by merely admixing the ethylene with the catalyst slurry at room temperature and atmospheric pressure and allowing the mixture to stand until the ethylene has been absorbed or can be effected at temperatures below room temperature in some cases. Desirably, the preactivaton as well as the polymerization itself are effected at somewhat elevated temperatures and superatmospheric pressures for optimum results. Thus, pressures of at least 5 p.s.i. and in many cases 5–1000 p.s.i. or higher are desirably employed, although the pressure need not be higher than the pressure necessary to maintain the vehicle in liquid form at the temperature employed. The temperature can also be varied from room temperature or lower to temperatures of the order of 110° C. or 150° C. with temperatures of at least 50° C. and desirably 50–110° C. being usually employed.

The polymerization in accordance with the present invention can be carried out either batchwise or continuously, and the highly active catalytic slurries of this invention are particularly adapted to continuous operation wherein monomer, vehicle and preactivated catalyst slurry are continuously metered into the polymerization zone and a slurry of polymeric product is continuously withdrawn from the polymerization zone. The highly active nature of the catalytic slurries of this invention makes such continuous operation feasible since it is not necessary for the polymerization mixture to undergo an extended induction period before polymerization commences.

Although the preactivation of the ionic catalyst mixture is carried out with concentrations of 1–10% by weight of the catalyst mixture based on the weight of the vehicle in the slurry, the actual polymerization proper can be carried out under much more dilute conditions since the concentration of the activated catalyst can be reduced as much as 100 times with good results. Thus, using the greatly diluted polymerization mixtures which are made possible by means of this invention, the polymerization mixture does not become too thick for efficient stirring or cooling before all of the catalyst is used up. This obviates the necessity of inactivating catalyst at the end of the polymerization in many cases and also makes it possible to readily remove any catalyst which is trapped in the polymer or at least minimizing the concentration of residual catalyst to an unobjectionable level. The concentration of monomer in the polymerization mixture can be varied widely with concentrations of 2–50% by weight, and preferably 2–10% by weight, based on the weight of the vehicle being wholly operable. Concentrations of monomer in the vehicle of about 3–7% by weight are commonly employed, although higher concentrations ordinarily increase the rate of polymerization. Concentrations above 5–10% by weight are ordinarily less desirable when the vehicle employed is also a solvent for the polymer under the polymerization conditions since the polymer dissolved in the reaction medium results in a very viscous solution. Since the catalyst concentration in accordance with this invention can be greatly minimized, higher concentrations of monomer can be used than are ordinarily feasible since the catalyst concentration does not contribute in such a marked degree to the viscosity of the reaction mixture. Both the preactivation and the polymerization itself can be carried out under widely varying time conditions depending upon such variables as concentrations, temperatures and pressures employed. Thus, the polymerization time or the preactivation time can be varied from a few minutes to several hours or longer. Generally, the preactivation can be carried out in only a few minutes whereas the polymerization itself may require several hours for optimum yields of polymer.

The invention is illustrated by the following examples of certain preferred embodiments thereof, although it will be understood that the examples are merely illustrative and are not intended to limit the scope of the invention unless otherwise specifically indicated.

*Example 1*

An activated catalytic slurry was prepared by admixing about 20 g. of ethylene with an ionic catalyst mixture prepared by slurrying 8 g. of ethyl auminum sesquibromide and 3.5 g. of tetra 2-ethylhexyl titanate in 500 ml. of heptane. The preactivation was carried out in a closed reactor under a nitrogen atmosphere and under a positive ethylene pressure of 5 p.s.i. When about 20 g. of ethylene had been absorbed, the resulting activated slurry was diluted with 3.3 liters of heptane, and the polymerization system was pressured with ethylene to 5 p.s.i. for 3 hours. Heat liberated by the polymerization was sufficient to keep the reaction temperature at 50–60° C. during most of the polymerization period. The solid polyethylene thus produced was washed free of catalyst with several portions of hot methanol. The product weighed 287 g. The advantages of the preactivated catalyst were demonstrated by the fact that when the same quantities of catalyst in the same ratio were used without preactivation in 500 ml. of heptane, no more than 120 g. of polymer was obtained in any of a number of repeated experiments because the polymerization mixture became too thick to stir before all of the catalyst was used up. When the quantity of of unactivated catalyst was reduced so that the final polymer slurry was less concentrated, the polymerization reaction failed to start. For example, when the catalyst mixture described above was used without preactivation but diluted with 3.3 liters of heptane, the solution contained only 0.13% (v./v.) of catalyst, and the polymerization could not be initiated. This was in contrast to the results obtained using the activated catalyst as described above under exactly the same dilution and other conditions wherein 287 g. of high quality product was obtained. Furthermore, in the process embodying this invention, the use of catalyst concentrations of 0.13% of activated catalyst instead of concentrations of more than 1% of catalyst results in a great saving in the cost of catalyst, particularly when it is considered that the more highly concentrated catalyst system contained relatively large amounts of unused catalyst when it became necessary to terminate the polymerization because of the viscosity of the solution.

*Example 2*

As has been indicated hereinabove, the activated catalytic slurries embodying the invention need not be freshly prepared but can be prepared and stored until needed. Thus, ethylene was polymerized in a polymerization reactor provided with a catalyst reservoir as well as a solvent reservoir. The catalyst reservoir was filled in a nitrogen atmosphere with 300 ml. of heptane containing 4 g. of ethyl aluminum sesquibromide and 2 g. of titanium tetrachloride. The catalyst container was then connected to the polymerizer and air in the polymerization vessel was displaced with ethylene. The resulting catalyst solution was added to the reaction vessel and polymerization started at once. Heptane was fed continuously from the solvent reservoir into the polymerizer at the rate of 1 liter per hour for 4 hours. Heat liberated by the polymerization kept the reaction temperature at 50–60° C. for a period of 6 hours. At the end of this time, methanol was added to deactivate the catalyst, and 306 g. of solid polyethylene having a melt index of 0.65 was recovered by filtration. It is thus apparent that the highly active catalyst slurry prepared by preactivation with ethylene can be used at its initial concentration and the polymerization mixture diluted during the course of the reaction in order to keep the viscosity at a sufficiently low level to permit stirring, without thereby stopping the course of the polymerization by such dilution.

*Example 3*

An activated catalyst slurry was prepared by adding ethylene to a solution of 0.8 g. of ethyl aluminum sesquibromide and 0.4 g. of titanium tetrachloride in 50 ml. of heptane until 2 g. of the gas had been absorbed. As in the preceding examples, the activation of the catalyst proceeded without any additional heating of the slurry. The activated slurry was then transferred to a nitrogen-filled autoclave and diluted with an additional 450 ml. of heptane. Ethylene was charged to the autoclave to a pressure of 1000 p.s.i., and the mixture was agitated and heated at 70° C. for 20 hours. After being purified by washing with methanol, 101.8 g. of polyethylene was obtained.

*Example 4*

The highly active catalyst slurries of this invention are particularly applicable for use in continuous polymerization systems. A typical continuous operation is illustrated by the following data. A preactivated slurry was prepared by contacting a 1% (v./v.) solution in toluene of ethyl aluminum sesquibromide containing an equimolar amount of titanium tetrachloride with sufficient ethylene to yield a slurry containing 3% solids. A 50-gallon reactor was charged with 32 gallons of dry toluene which was then stirred and heated at 60° C. under an ethylene pressure of 10 p.s.i. while the preactivated slurry was fed into the reactor at the rate of 2 gallons per hour. A slurry of polyethylene in toluene was drawn off from the reactor at the rate of 10 gallons per hour, and the reactor level was maintained by adding fresh toluene continuously. During an 84-hour period of continuous operation, an average of 10 pounds of polyethylene per hour was produced. The melt index of the polymer varied between 0.4 and 0.6. This continuous operation at good yields was made possible because of the high activity of the activated catalyst slurry which remained stable and hence could be produced in volume and used as needed.

*Example 5*

The activated catalysts are also suitably employed for polymerizing the higher α-monoolefins and indeed give improved results from the standpoint of increased crystallinity of the polymeric product. Thus, the 50-gallon reactor described in the preceding example was charged with 30 gallons of dry toluene which was stirred and kept at 60° C. under a propylene pressure of 10 p.s.i. while an activated slurry was fed into the reactor at the rate of 2 gallons per hour. The activated slurry was prepared by contacting an 0.5% (v./v.) solution in toluene of aluminum triethyl containing one-fourth the molar equivalent of titanium tetrachloride with ethylene to yield a slurry containing 3% total solids. As before, fresh toluene was continuously added to the reactor along with additional preactivated slurry, and the pressure was maintained by addition of propylene to the reactor for a period of 72 hours, a slurry of polypropylene in toluene was drawn off from the reactor at a rate of 10 gallons per hour, and the product of polypropylene averaged 9.1 pounds per hour over the 72-hour period. The melt index of a composite sample of the polypropylene produced was 2.35. A dried sample of the polypropylene produced was extracted successively with boiling acetone, diisopropyl ether and heptane but showed a weight loss of only 9%. A sample of polypropylene prepared in the laboratory with the same catalyst which had not been preactivated and which was used in a concentration of 0.5% showed a 27% weight loss when subjected to the same extraction treatment. Since the extraction treatment removes amorphous polypropylene, it is apparent that a considerably larger proportion of the product obtained with the preactivated slurry is crystalline than when an unactivated catalyst mixture is employed.

*Example 6*

The process of the invention is also applicable for forming high quality copolymers of any of the monoethylenic monomers as well as the homopolymers of the individual monomers such as styrene, vinyl chloride, and the α-monoolefins of 2–10 carbon atoms. Thus, an activated catalyst slurry was prepared by adding 15 g. of ethylene to 300 ml. of heptane containing 5 g. of ethyl aluminum sesquibromide and 2 g. of titanium tetrachloride. This slurry was then diluted with 1 liter of heptane, and a mixture of ethylene and propylene containing about 88% ethylene and 12% propylene was fed into the reactor for a period of 5 hours. During the first 140 minutes, fresh heptane was added continuously at the rate of 1 liter per hour. The reaction temperature was maintained at 50°–60° C. throughout the polymerization. The resulting ethylenepropylene copolymer was isolated by filtration and washed free of catalyst and heptane with hot methanolic sodium hydroxide solution and water. The copolymer weighed 370 g. and had a melt index of 1.92. Similar results were achieved by substituting butene-1 as the monomer as well as runs wherein the monomer consisted of pentene-1, 3-methylbutene-1, 4-methylpentene-1 and 4,4-dimethyl pentene-1.

Thus by means of this invention it is possible to greatly enhance the activity of any of the well known ionic catalyst mixtures by a pre-reaction of the catalyst slurry with ethylene. By this means, a relatively concentrated catalyst slurry can be reacted with a relatively minor amount of ethylene to give a highly active catalytic slurry which can thereafter be used in greatly diluted form with excellent results. The amount of catalyst necessary in order to achieve commercial polymerization is greatly minimized, and continuous processing is entirely feasible. Concentrations of catalyst during the polymerization below 0.5% are readily employed in accordance with this invention, and the products obtained are readily freed of catalyst. The use of dilute polymerization systems makes possible the production of high yields of polymer per part of catalyst without increasing the viscosity of the reactive mixture beyond the practical limit. This makes possible the use of much smaller amounts of catalyst per weight of polymer with a resultant saving in catalyst cost, and it is not necessary to undergo an extended induction period or to have high catalyst concentrations in order to initiate the polymerization.

Although the invention has been described in detail with particular reference to certain reactants, ionic catalysts, and reaction conditions, it will be understood that variations and modifications can be effected, and that any of the other well known ionic catalyst mixtures as described herein and known to the art can be preactivated in like manner within the spirit and scope of the invention as described hereinabove and as defined in the appended claims.

We claim:

1. In the polymerization of polymerizable material consisting of at least one α-monoolefin of 2–10 carbon atoms by means of an ionic catalyst mixture effective to polymerize such polymerizable material, including a metal alkyl and a titanium compound, in an inert organic liquid vehicle being a member selected from the group consisting of hydrocarbons and chlorinated hydrocarbons, the improvement which comprises effecting the polymerization of said polymerizable material in said inert organic liquid vehicle by bringing together said polymerizable material, said inert organic liquid vehicle and 0.01–0.5% by weight based on said vehicle of a catalytic slurry of greatly enhanced activity obtained by prereacting a slurry, in an inert organic liquid vehicle, of 1–10% by weight of said catalyst mixture based on the weight of vehicle in said slurry and 2–3 parts by weight of ethylene based on the weight of said catalyst mixture.

2. The method of polymerizing polymerizable material consisting of at least one aliphatic α-monoolefin of 2–10 carbon atoms which comprises polymerizing said polymerizable material at a temperature of at least 50° C. and under superatmospheric pressure in an inert organic liquid vehicle being a member selected from the group consisting of hydrocarbons and chlorinated hydrocarbons to which has been added 0.01–0.5% by weight based on said vehicle of a highly active catalytic slurry obtained by reacting a slurry, in an inert organic liquid vehicle being a member selected from the group consisting of hydrocarbons and chlorinated hydrocarbons, of 1–10% by weight of an ionic catalyst mixture effective to polymerize such polymerizable material, including an alkyl of a metal from the group consisting of alkali metals and aluminum, and a titanium compound, and 2–3 parts by weight of ethylene based on the weight of said catalyst mixture.

3. The method of polymerizing ethylene which comprises heating at a temperature of at least 50° C. and under superatmospheric pressure a mixture of 2–50% by weight based on the vehicle of ethylene, an inert organic liquid vehicle and 0.01–0.5% by weight based on said vehicle of a highly active catalytic slurry obtained by reacting a slurry, in an organic liquid vehicle being a member selected from the group consisting of hydrocarbons and chlorinated hydrocarbons, of 1–10% by weight based on the weight of vehicle being a member selected from the group consisting of hydrocarbons and chloriinated hydrocarbons in said slurry of an ionic catalyst mixture effective to polymerize ethylene an organoaluminum compound a titanium compound with 2–3 parts by weight of ethylene based on the weight of said catalyst mixture.

4. The method of polymerizing propylene which comprises heating at a temperature of at least 50° C. and under superatmospheric pressure a mixture of 2–50% by weight based on the vehicle of propylene, an inert organic liquid vehicle being a member selected from the group consisting of hydrocarbons and chlorinated hydrocarbons and 0.01–0.5% by weight based on said vehicle of a highly active catalytic slurry obtained by reacting a slurry, in an organic liquid vehicle being a member selected from the group consisting of hydrocarbons and chlorinated hydrocarbons, of 1–10% by weight based on the weight of vehicle in said slurry of an ionic catalyst mixture effective to polymerize propylene an organoaluminum compound and a titanium compound with 2–3 parts by weight of ethylene based on the weight of said catalyst mixture.

5. The method of polymerizing ethylene which comprises heating at a temperature of at least 50° C. and superatmospheric pressure a mixture of 2–50% by weight based on the vehicle of ethylene, a liquid hydrocarbon vehicle, and 0.01–0.5% by weight based on said vehicle of a highly active catalytic slurry obtained by reacting a slurry, in a liquid hydrocarbon vehicle, of 1–10% by weight based on the weight of the vehicle in the slurry of an ionic catalyst mixture of ethylaluminum sesquibromide and titanium tetrachloride in a mole ratio of from 1:4 to 4:1, with 2–3 parts by weight of ethylene based on the weight of said catalyst mixture.

6. The method of copolymerizing ethylene and propylene which comprises heating at a temperature of at least 50° C. and superatmospheric pressure a mixture of 2–50% by weight based on the vehicle of a mixture of ethylene and propylene, a liquid hydrocarbon vehicle, and 0.01–0.5% by weight based on said vehicle of a highly active catalytic slurry obtained by reacting a slurry, in a liquid hydrocarbon vehicle, of 1–10% by weight based on the weight of the vehicle in the slurry of an ionic catalyst mixture of ethylaluminum sesquibromide and titanium tetrachloride in a mole ratio of from 1:4 to 4:1, with 2–3 parts by weight of ethylene based on the weight of said catalyst mixture.

7. The method of polymerizing propylene which comprises heating at a temperature of at least 50° C. and superatmospheric pressure a mixture of 2–50% by weight based on the vehicle of propylene, a liquid hydrocarbon vehicle, and 0.01–0.5% by weight based on said vehicle of a highly active catalytic slurry obtained by reacting a slurry in a liquid hydrocarbon vehicle, of 1–10% by weight based on the weight of the vehicle in the slurry of an ionic catalyst mixture of aluminum triethyl and titanium tetrachloride in a mole ratio of about 4:1, with 2–3 parts by weight of ethylene based on the weight of said catalyst mixture.

References Cited in the file of this patent

UNITED STATES PATENTS

| | | |
|---|---|---|
| 2,721,189 | Anderson et al. | Oct. 18, 1955 |
| 2,833,755 | Coover | May 6, 1958 |
| 2,845,414 | Schutze | July 29, 1958 |
| 2,862,917 | Anderson et al. | Dec. 2, 1958 |
| 2,867,612 | Pieper et al. | Jan. 6, 1959 |
| 2,891,935 | Lanning | June 23, 1959 |

FOREIGN PATENTS

| | | |
|---|---|---|
| 533,362 | Belgium | May 16, 1955 |
| 538,782 | Belgium | Dec. 6, 1955 |
| 791,889 | Great Britain | Mar. 12, 1958 |

UNITED STATES PATENT OFFICE
CERTIFICATE OF CORRECTION

Patent No. 3,067,183                          December 4, 1962

Hugh J. Hagemeyer, Jr., et al.

It is hereby certified that error appears in the above numbered patent requiring correction and that the said Letters Patent should read as corrected below.

Column 1, line 19, for "ordiarily" read -- ordinarily --; line 43, for "manganesium" read -- maganesium --; same column 1, line 58, for "haide" read -- halide --; column 2, line 43, for "to" read -- of --; column 8, lines 66 and 67, for "chloriinated" read -- chlorinated --; line 67, strike out "of" and insert the same after "ethylene" in line 68, same column 8; line 69, after "compound", first occurrence, insert -- and --; column 9, line 8, strike out "of" and insert the same after "propylene" in line 9, same column 9.

Signed and sealed this 14th day of April 1964.

(SEAL)
Attest:

ERNEST W. SWIDER

Attesting Officer

EDWARD J. BRENNER

Commissioner of Patents